US008069417B2

(12) United States Patent
Brush et al.

(10) Patent No.: US 8,069,417 B2
(45) Date of Patent: Nov. 29, 2011

(54) BIFOCAL VIEW: A NOVEL CALENDAR USER INTERFACE

(75) Inventors: Alice Jane Bernheim Brush, Bellevue, WA (US); Danyel A. Fisher, Seattle, WA (US); Jason C. Mayans, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/537,523

(22) Filed: Sep. 29, 2006

(65) Prior Publication Data

US 2008/0082925 A1    Apr. 3, 2008

(51) Int. Cl.
*G06Q 10/00* (2006.01)
(52) U.S. Cl. ........ 715/764; 715/751; 715/963; 705/7.18
(58) Field of Classification Search .................. 715/963, 715/751; 705/7.18
See application file for complete search history.

(56) References Cited

U.S. PATENT DOCUMENTS

| 4,807,155 | A | * | 2/1989 | Cree et al. ................. 715/733 |
| 4,831,552 | A | * | 5/1989 | Scully et al. .................. 715/751 |
| 4,881,179 | A | * | 11/1989 | Vincent ........................ 358/1.14 |
| 5,129,057 | A | | 7/1992 | Strope |
| 5,261,045 | A | * | 11/1993 | Scully et al. .................. 715/751 |
| 5,457,476 | A | * | 10/1995 | Jenson ............................ 715/823 |
| 5,805,444 | A | * | 9/1998 | Seymour .......................... 700/16 |
| 5,877,759 | A | * | 3/1999 | Bauer ............................ 719/317 |
| 6,085,166 | A | * | 7/2000 | Beckhardt et al. ................. 705/9 |
| 6,101,480 | A | * | 8/2000 | Conmy et al. .................... 705/9 |
| 6,236,396 | B1 | * | 5/2001 | Jenson et al. .................. 715/764 |
| 6,269,341 | B1 | * | 7/2001 | Redcay, Jr. ........................ 705/8 |
| 6,313,852 | B1 | * | 11/2001 | Ishizaki et al. ................. 715/751 |
| 6,370,554 | B1 | | 4/2002 | Sun-Woo |
| 6,603,489 | B1 | * | 8/2003 | Edlund et al. .................. 715/780 |
| 6,892,356 | B2 | * | 5/2005 | Ishizaki et al. ................. 715/751 |
| 7,174,517 | B2 | * | 2/2007 | Barnett et al. ................. 715/764 |
| 7,283,530 | B2 | * | 10/2007 | Bullis et al. .................... 370/394 |
| 7,370,282 | B2 | * | 5/2008 | Cary ............................. 715/772 |
| 7,441,194 | B2 | * | 10/2008 | Vronay et al. ................. 715/738 |
| 2003/0156138 | A1 | * | 8/2003 | Vronay et al. ................. 345/772 |
| 2004/0073615 | A1 | * | 4/2004 | Darling ......................... 709/206 |
| 2004/0268270 | A1 | * | 12/2004 | Hill et al. ...................... 715/963 |
| 2005/0039142 | A1 | * | 2/2005 | Jalon et al. .................... 715/823 |

(Continued)

FOREIGN PATENT DOCUMENTS

WO     0060514     10/2000

OTHER PUBLICATIONS

Cotton Software: Cotton Calendar Description http://www.cotton100.com/calmoreinfo.htm last viewed Jul. 13, 2006, 3 pages.

(Continued)

*Primary Examiner* — Kieu Vu
*Assistant Examiner* — Patrick Riegler
(74) *Attorney, Agent, or Firm* — Lee & Hayes, PLLC

(57) ABSTRACT

The claimed subject matter provides a system and/or a method that facilitates creating a calendar that enables optimized awareness of at least one event. An interface component can receive data related to an event. An enhanced scheduler component can create a calendar that enables a bifocal calendar view to display an event correlated to a first date with a first time-scale and an event correlated to a second date with a second time-scale.

20 Claims, 14 Drawing Sheets

U.S. PATENT DOCUMENTS

| | | | |
|---|---|---|---|
| 2005/0041667 A1 | 2/2005 | Miller et al. | |
| 2005/0044066 A1* | 2/2005 | Hooper et al. | 707/3 |
| 2005/0057584 A1 | 3/2005 | Gruen et al. | |
| 2005/0125737 A1 | 6/2005 | Allen et al. | |
| 2005/0132300 A1* | 6/2005 | Luhrs | 715/776 |
| 2005/0210411 A1* | 9/2005 | Morita | 715/825 |
| 2005/0246666 A1* | 11/2005 | Kalinoski et al. | 715/963 |
| 2005/0257176 A1* | 11/2005 | Lu | 715/963 |
| 2006/0028917 A1 | 2/2006 | Wigginton | |
| 2006/0069604 A1 | 3/2006 | Leukart et al. | |

OTHER PUBLICATIONS

ERoom: Calendars http://www.sccmecomdmz.sccm.org/eRoomHelp/calendars.htm last viewed Jul. 13, 2006, 7 pages.

SBSH Mobile Software—Making smaller bigger http://www.sbsh.net/products/calendar_plus/ last viewed Jul. 13, 2006, 3 pages.

Iambic. Agendus for Palm OS Edition :: Version History http://www.iambic.com/agenduspro/palmos/whatsnew.asp last viewed Jul. 13, 2006, 7 pages.

* cited by examiner

BIFOCAL VIEW: A NOVEL CALENDAR USER INTERFACE

BACKGROUND

Everyday life (e.g., office life, family life, work, etc.) involves a myriad of mundane and/or routine activities: for example, recurring soccer games, piano lessons, doctors' appointments, work schedules, relatives' visits, family outings, softball practices, after-school activities, meetings, lunch appointments, conference calls, work appointments, teleconferences, workout schedules, and much more. These events must all be scheduled and coordinated between family members and/or colleagues and then re-scheduled if things do not go as planned or conflicts arise. As a result, a complex routine for awareness and coordination is often required to manage the everyday activities that constitute work, personal, and family aspects of life. This notion of coordination extends beyond the home and work to also encompass activities while on-the-go. For example, it involves scheduling appointments while at the doctor's office or checking the calendar at work for evening events.

Despite people using various organization schemes, coordination among family members and/or colleagues still remains an everyday problem for many people. Paper calendars are one tool used by families to help stay organized and tend to be easy to use, personalizable, and create an instant archive of family and/or work activities. Yet the downside is paper calendars are not available outside the home and/or work or available to more than one person (e.g., family member, friend, colleague, etc.) at a time when one person is at home and/or work and one person is away from the home and/or work. Thus, sharing paper calendars between multiple people can be challenging if not impossible most of the time since there is typically only one copy of the paper calendar. Moreover, families, friends, and/or colleagues are limited to keeping the paper calendar centrally located such as in a single location which restricts access to it when away from such location.

Based on the deficiencies associated with paper calendars, people have turned to conventional digital (e.g., electronic, etc.) calendars as a possible remedy. However, these often cannot handle the large amounts of data (e.g., events, dates, appointments, meetings, etc.) associated with more than one date. Current digital calendars typically utilize three time-scaled viewing options such as daily, weekly, or monthly. In addition, some calendars employ an "agenda view," which conveys a listing of upcoming events. Thus, people having multiple events per day (e.g., office worker, families, social groups, peers, friends, etc.) often leave their digital calendar in day view, so appointments for the current day are visible. Yet, such configuration highly restricts a user to view solely the currently selected date which can prove to be extremely difficult and painstaking in relation to scheduling, planning, coordinating, rescheduling, being aware, searching, etc. events associated with a digital (e.g., electronic) calendar.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate creating a calendar that implements a bifocal view to enable optimized awareness of events. An enhanced scheduler component can create a calendar that provides a first field for a selected date and respective events and a second field for a portion of selectable dates with respective events simultaneously. In other words, the calendar can employ a bifocal calendar view that enables a user to examine a selected date (e.g., Nov. 1, 2006) with associated events (e.g., lunch appointment at 5:00 pm, dinner at 7:00 pm, etc.), while also allowing the user to examine surrounding dates (e.g., future and/or past dates in reference to Nov. 1, 2006) and corresponding events. This bifocal calendar view allows users to view all events on a particular date while still having awareness of upcoming and/or past events.

In accordance with one aspect of the claimed subject matter, the enhanced scheduler component can utilize a data manager component that can evaluate data related to an event within the calendar to utilize the bifocal calendar view. In one example, the data manager component can provide one of placing an event with a corresponding date within the calendar, providing event linkage that identifies a relationship between one or more events, identifying a conflict associated with one or more events, planning, scheduling, searching for an event, presenting information to the user, and identifying user-defined event data to display on the bifocal calendar view such as meeting location, an appointment member, a time of event, and a meeting response.

In accordance with another aspect of the claimed subject matter, the enhanced scheduler component can employ a settings component. The settings component can implement settings and/or configurations corresponding to a specific user. The settings component can utilize default settings associated with the bifocal calendar view, user-defined settings, and/or any combination thereof. Furthermore, the enhanced scheduler component can utilize a search component that facilitates querying data associated with the bifocal calendar view. For instance, based on displaying selected date with event data and surrounding dates with event data simultaneously, the user may desire to query the calendar for a particular item, person, event, location, etc. In other aspects of the claimed subject matter, methods are provided that facilitate employing a bifocal view associated with a calendar that allows a user to coordinate multiple events on a plurality of dates.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
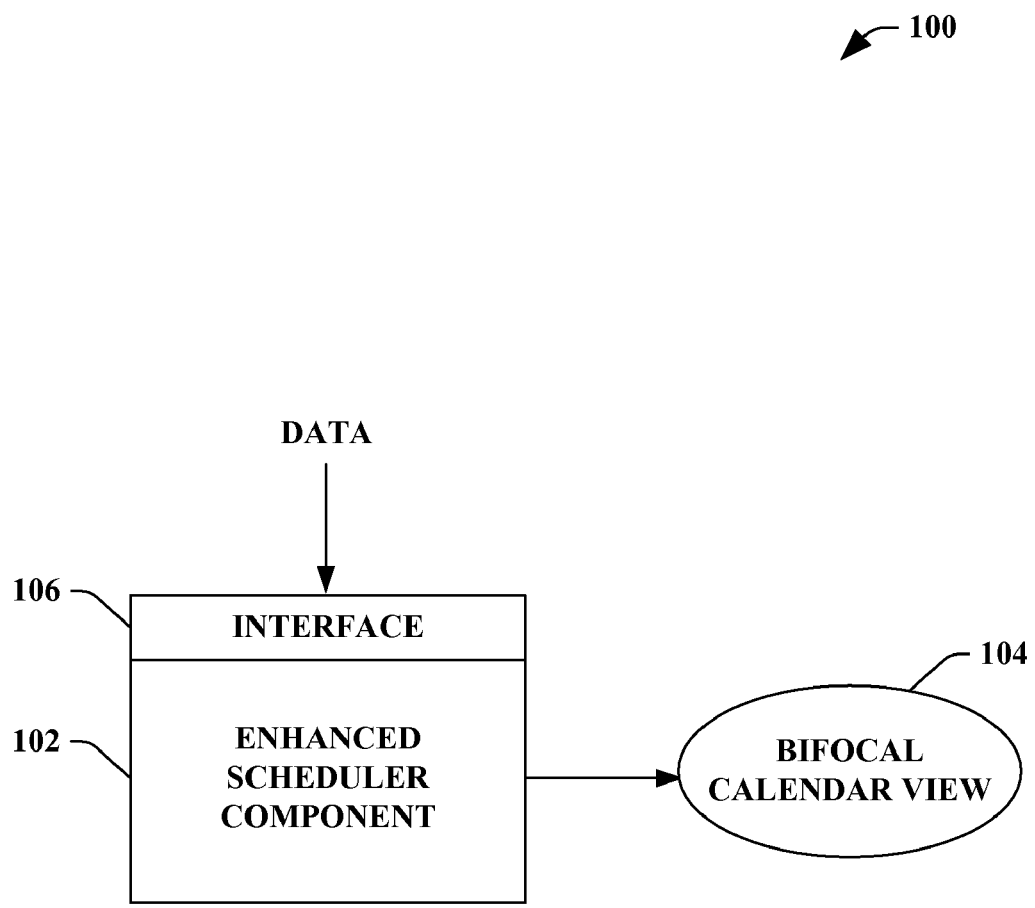
FIG. 1 illustrates a block diagram of an exemplary system that facilitates creating a calendar that implements a bifocal view to enable optimized awareness of events.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "view," "calendar," "user interface," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates creating a calendar that implements a bifocal view to enable optimized awareness of events. The system 100 can include an enhanced scheduler component 102 that can receive data via an interface component 106 (herein referred to as interface 106 and discussed in more detail infra), wherein the enhanced scheduler component 102 can create a bifocal calendar view 104 that enables the display of event data with a first time-scale and disparate event data with a second time-scale. In other words, the bifocal calendar view 104 allows the display of event data corresponding to a selected date on the calendar while also displaying event data corresponding to a portion of disparate dates (e.g., adjacent dates, past dates, future dates, non-contiguous dates, etc.) on the calendar. For instance, a user can select Sep. 21, 2006 as a date to view all related events that day (e.g., a meeting at 1:00 pm, a scrimmage at 4:00 pm, etc.), yet the calendar can simultaneously display other dates and/or events. Thus, while displaying Sep. 21, 2006 and related events, the bifocal calendar view 104 can further display disparate dates and events to the user (e.g., adjacent date with or without an event, a past date with or without an event, a future date with or without an event, etc.). Therefore, while a user is viewing the current selected date (e.g. in this example, Sep. 21, 2006), he and/or she is aware of upcoming and/or surrounding events scheduled for disparate dates (e.g., vacation on September 24 through September 26, etc.). Such simultaneous display and/or view incorporating selected dates (e.g., current date) and non-selected dates (e.g., future dates and/or surrounding dates) allows a user to see what is happening on a particular day as well as upcoming and/or surrounding events in the same view.

The system 100 can create the bifocal calendar view 104 based at least in part upon received data via the interface 106. The data can be, but is not limited to, events (e.g., any suitable thing that happens and/or occurs, an occasion and/or activity), a date, an appointment, a schedule, a meeting, a time, a setting, a preference, a configuration, a meeting date correlating to a time and/or date, event data (e.g., who, what, where, why, how, etc.), calendar date, etc. It is to be appreciated that the system 100 can allow users to view all events and/or scheduled data related to a particular day while still having awareness of disparate events correlating to a disparate date and/or time. For example, the bifocal calendar view 104 can show today's events and as well as a partial month view with each day in the month illustrating events and/or appointments. Moreover, the bifocal calendar view 104 can show the day's events in a typical grid format and upcoming events in list. Still further, the bifocal calendar view 104 can show a selected week's events while simultaneously displaying month-scaled events.

Moreover, the system 100 can include any suitable and/or necessary interface component 106 (herein referred to as "interface"), which provides various adapters, connectors, channels, communication paths, etc. to integrate the enhanced scheduler component 102 into virtually any operating and/or database system(s). In addition, the interface can provide various adapters, connectors, channels, communication paths, etc., that provide for interaction with the enhanced scheduler component 102, bifocal calendar view 104, and any other device and/or component associated with the system 100.

Figure 2:
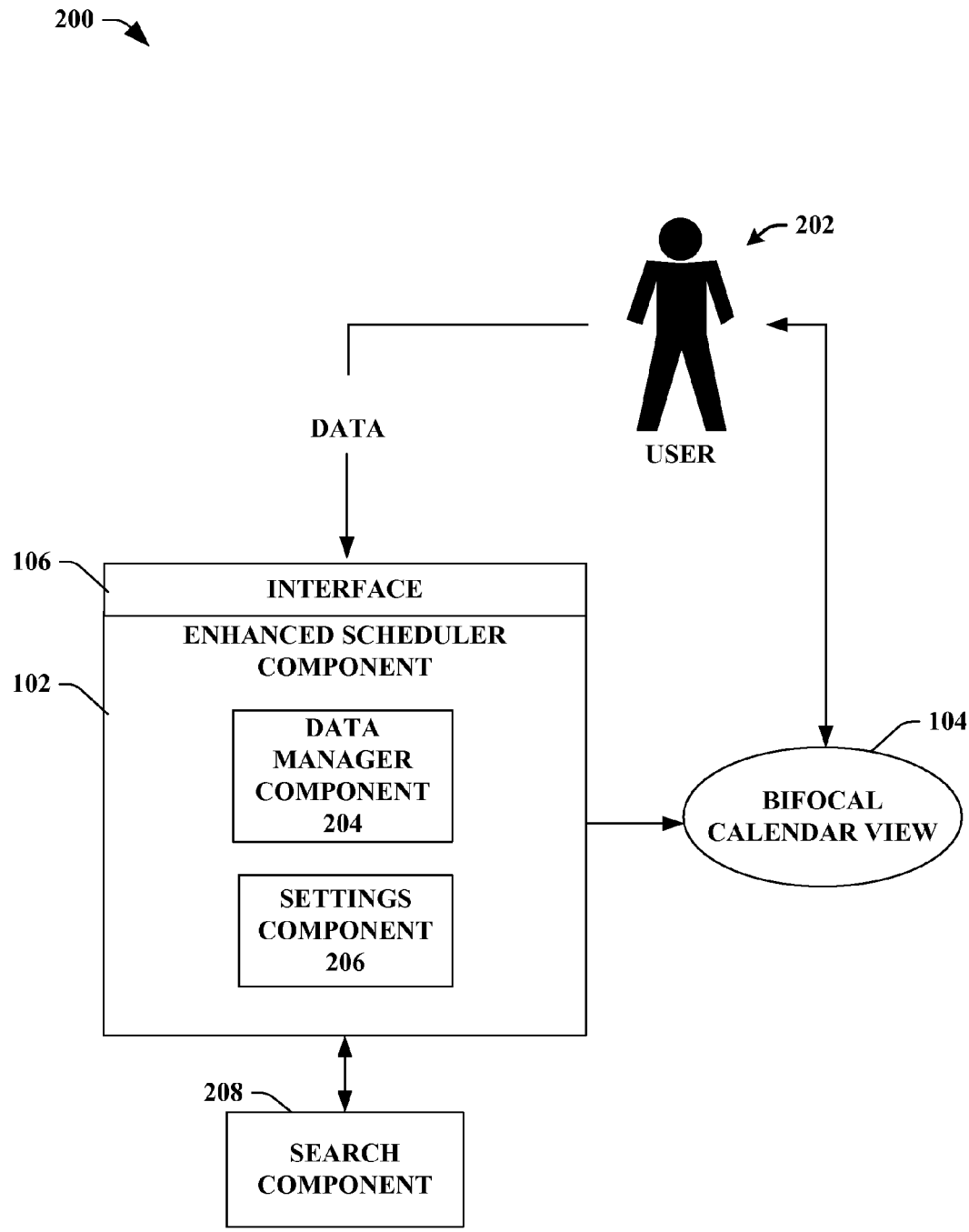
FIG. 2 illustrates a block diagram of an exemplary system that facilitates employing a bifocal view associated with a calendar that allows a user to coordinate multiple events on a plurality of dates.

FIG. 2 illustrates a system 200 that facilitate employing a bifocal view associated with a calendar that allows a user to coordinate multiple events on a plurality of dates. The enhanced scheduler component 102 can provide the bifocal calendar view 104 that enables a user 202 to view at least one event related to a date with a first time-scale and a disparate event related to a disparate date in a second time-scale. In other words, the user 202 can view a date displaying the details and/or events while still seeing the surrounding dates and respective details and/or events related thereto. The bifocal calendar view 104 can show information and/or data from different time scales in the same view.

For instance, the user 202 can input data such as schedules, appointments, events, meetings, etc. via the interface 106. Based on such data, the enhanced scheduler component 102 can create a bifocal calendar view 104 that displays such data to the user 202 in an optimized, enhanced, and novel manner. The user 202 can view a particular date and examine specific correlating events for such date while simultaneously examining disparate dates with correlating events. For instance, a user can view a first portion with a daily time scale while the second portion can utilize a weekly time scale. Upon selecting a particular date, the first portion can display such date in the daily time scale (e.g., hourly, half-hourly, etc.) with specific event data related to the selected date. However, while displaying such daily time scaled in the first portion, the second portion can display surrounding weeks (in reference to the selected date) in the weekly time scale (Sunday, Monday, Tuesday, Wednesday, Thursday, Friday, and Saturday) with respective events and/or appointments.

The enhanced scheduler component 102 can utilize a data manager component 204 that can evaluate data received via the interface 106 to utilize such data within the bifocal calendar view 104. The data manager component 104 can identify data to utilize such data within the bifocal calendar view, wherein such identification provides at least one of the following: placing an event with a corresponding date within the calendar; providing event linkage (e.g., identifying relationships between events so as to illustrate linkage and/or relationship); identifying most any conflicts associated with events; planning; scheduling; searching for an event; presenting information to the user 202; and identifying user-defined event data to display on the bifocal calendar view (e.g. event data such as, but not limited to, meeting location, appointment members, time of event, meeting responses, etc.). Moreover, the data management component 204 can provide management associated with any suitable data related to the system 200. For instance, a plurality of events can be received related to a particular user 202, wherein such events can be incorporated into the bifocal calendar view 104 and displayed to such user 202 based upon user-defined settings and/or configurations.

The enhanced scheduler component 102 can further utilize a settings component 206. The settings component 206 can implement settings and/or configurations corresponding to a specific user. In other words, the system 200 can utilize a plurality of user profiles, wherein each user profile can relate to a user and specific settings and/or details associated therewith. The settings component 206 can utilize default settings associated with the bifocal calendar view 104, user-defined settings, and/or any combination thereof. For instance, a user can utilize the bifocal calendar view 104 and provide manipulations and/or changes associated with data display based on personal characteristics and/or needs. Thus, a first user may want event data such as who is attending to be displayed, while a second user may desire event data such as location to be displayed. Moreover, a third user may require event data such as who is attending and location to be displayed. It is to be appreciated that the settings component 206 can provide any suitable settings (e.g. default and/or user defined) such as, but not limited to, mouse hover and data display, event data display, calendar views, time-scale for a first view and a second view, event linkage settings, alerts, information bubbles associated with events (e.g., displaying particular event data such as, but not limited to, meeting location, appointment members, time of event, meeting responses, etc.), conveying the details and/or intensity about surrounding dates based on the selected date (e.g., displaying future/surrounding events/data), aesthetics, planning, re-scheduling, presentation information, color variance for events and related intensity, search settings, etc.

The system 200 can further employ a search component 208 to facilitate querying data associated with the bifocal calendar view 104. For instance, based on displaying selected date with event data and surrounding dates with event data simultaneously, the user may desire to query the calendar for a particular item, person, event, location, etc. In general, the user 202 can implement a search function that allows a search to find events associated with the selected date view (e.g., current date view in a first time-scale) and/or find events associated with the surrounding dates view (e.g., future and/or surrounding dates view in a second time-scale). In other words, a selected date such as Aug. 28, 2006 can be selected displaying events such as lunch meeting at 1:00 pm and a movie date at 7:00 pm. A search can be employed to find related data associated with the movie on Aug. 28, 2006 to provide results such as any other movie, any events with that person, any events with the title of the movie, etc. Moreover, in order to efficiently present results to the user, the results can be identified in the view having surrounding the date Aug. 28, 2006. Therefore, any results can be highlighted, bolded, and/or any other suitable identification technique to ensure the user is aware of such results.

The system 200 can further include a data store (not shown) that can include any suitable data related to the enhanced scheduler component, bifocal calendar view 104, search component 208, user 202, interface 106, data manager component 204, settings component 206, etc. For example, the data store can include, but not limited to including, time-scale data, event data, appointments, meetings, aesthetic data, user configurations, email data, dates, calendar data, user settings, query data, event linkage data, color variance data, planning data, etc.

It is to be appreciated that the data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 3:
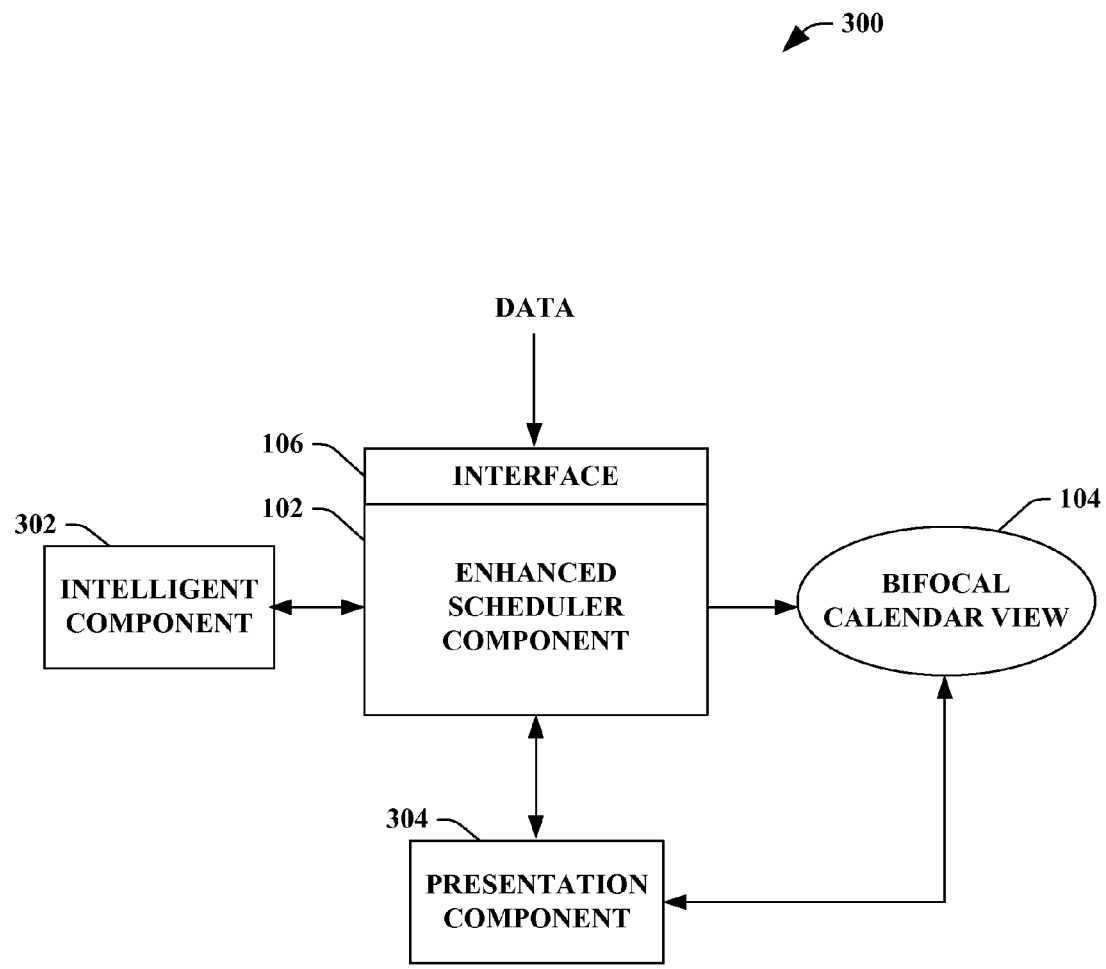
FIG. 3 illustrates a block diagram of an exemplary system that facilitates providing a bifocal view related to a calendar having a plurality of events associated therewith.

FIG. 3 illustrates a system 300 that employs intelligence to facilitate providing a bifocal view related to a calendar having a plurality of events associated therewith. The system 300 can include the enhanced scheduler component 102, the bifocal calendar view 104, and the interface component 106. It is to be appreciated that the enhanced scheduler component 102, the bifocal calendar view 104, and the interface component 106 can be substantially similar to respective components and views described in previous figures. The system 300 further includes an intelligent component 302. The intelligent component 302 can be utilized by the enhanced scheduler component 102 to facilitate simultaneously displaying portions of event data with disparate respective time-scales. For example, the intelligent component 302 can infer time-scales, views, event data display settings, user configurations, visual layout, user settings, user profiles, event linkages, scheduling conflicts, clutter reduction, appointment/meeting data, events, query data, etc.

It is to be understood that the intelligent component 302 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The enhanced scheduler component 102 can further utilize a presentation component 304 that provides various types of user interfaces to facilitate interaction between a user and any component coupled to the enhanced scheduler component 102. As depicted, the presentation component 304 is a separate entity that can be utilized with the enhanced scheduler component 102. However, it is to be appreciated that the presentation component 304 and/or similar view components can be incorporated into the enhanced scheduler component 102 and/or a stand-alone unit. The presentation component 304 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the enhanced scheduler component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
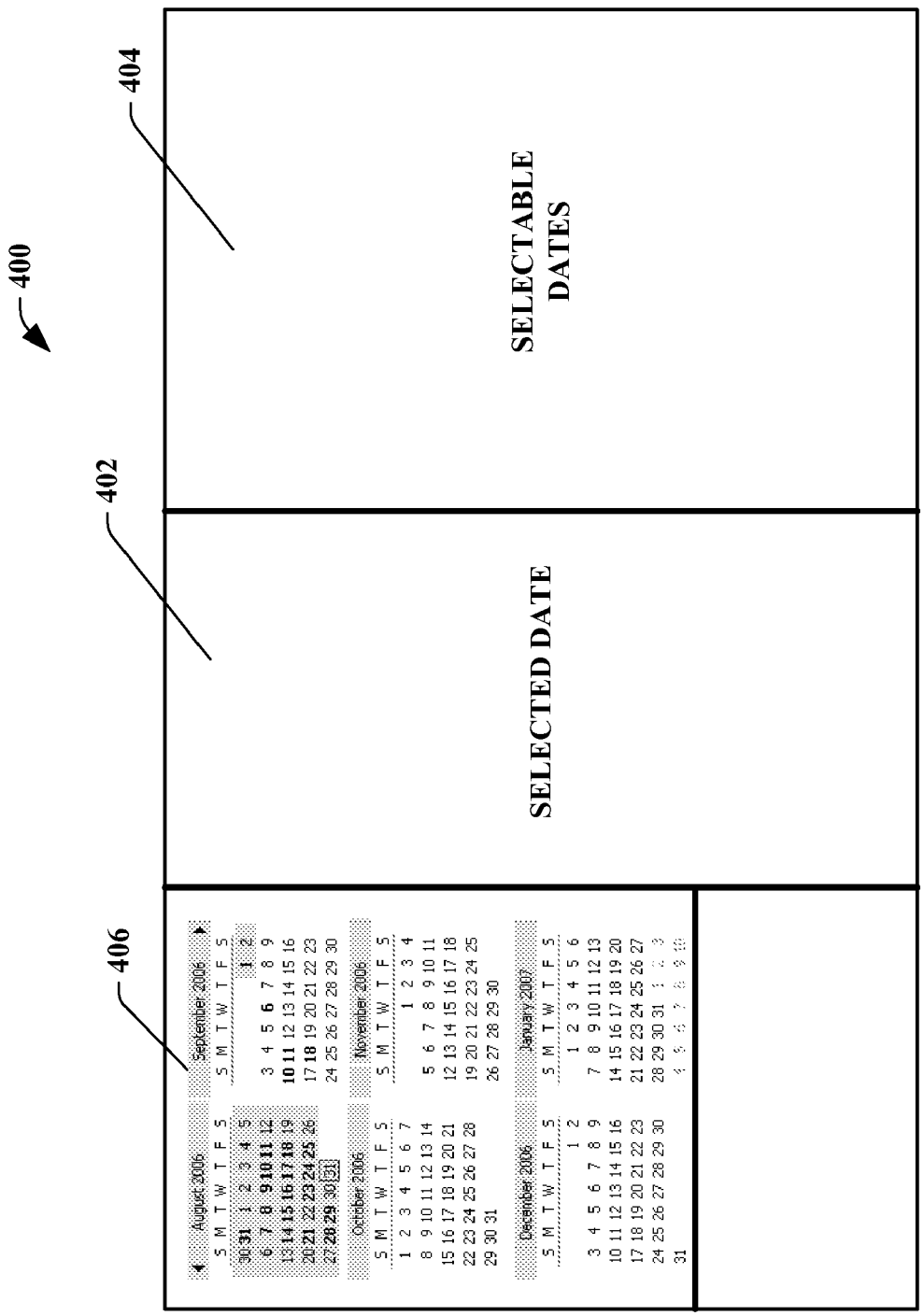
FIG. 4 illustrates a block diagram of an exemplary user interface that facilitates utilizing a bifocal view that displays a selected portion of data related to a first date and a portion of data related to a second later date.

FIG. 4 illustrates a user interface 400 that facilitates utilizing a bifocal view that displays a selected portion of data related to a first date and a portion of data related to a second later date. The user interface 400 can provide a bifocal calendar view that enables event data for a selected date in a first time-scale to be viewed while simultaneously presenting event data for surrounding dates in a second time-scale. For instance, a user can import any suitable scheduling data and/or or event data to the user interface 400, wherein the user can select Mar. 4, 2006 to be displayed. The first portion can display Mar. 4, 2006 events in a first time scale. For instance, the day can be broken down into hourly increments listing all the events for that day. Yet, a second portion can simultaneously display dates surrounding Mar. 4, 2006 (e.g., the selected date) and respective events in a second time scale. For instance, the week can be broken down into daily increments listing all the events for each day of the week.

The user interface 400 can include a first field 402 that displays a selected date and a second field 404 that displays selectable dates. It is to be appreciated that the first field 402 can be in a first time-scale (e.g., minutes, half-hours, hours, days, weekly, monthly, yearly, etc.), while the second field 404 can be in a second time-scale (e.g., minutes, half-hours, hours, days, weekly, monthly, yearly, etc.). The first field 402 time-scales can be smaller in comparison to the second field 404 time-scales, so as to allow simultaneous views of current and/or selected dates with surrounding and/or future dates. Thus, a user can select a date and view in hours in the first field 402, while viewing surrounding dates in a weekly scale in the second field 404. In addition, the user interface 400 can include a third field 406 that displays a yearly calendar with dates without event data details. For instance, the third field 406 can provide a larger scale view of where on the calendar a selected date is and/or surrounding dates are. However, it is to be appreciated that although this third field 406 illustrates location within the calendar, there is no specific details associated with events, whereas the second field 406 provides location on the calendar and specific event data.

Figure 5:
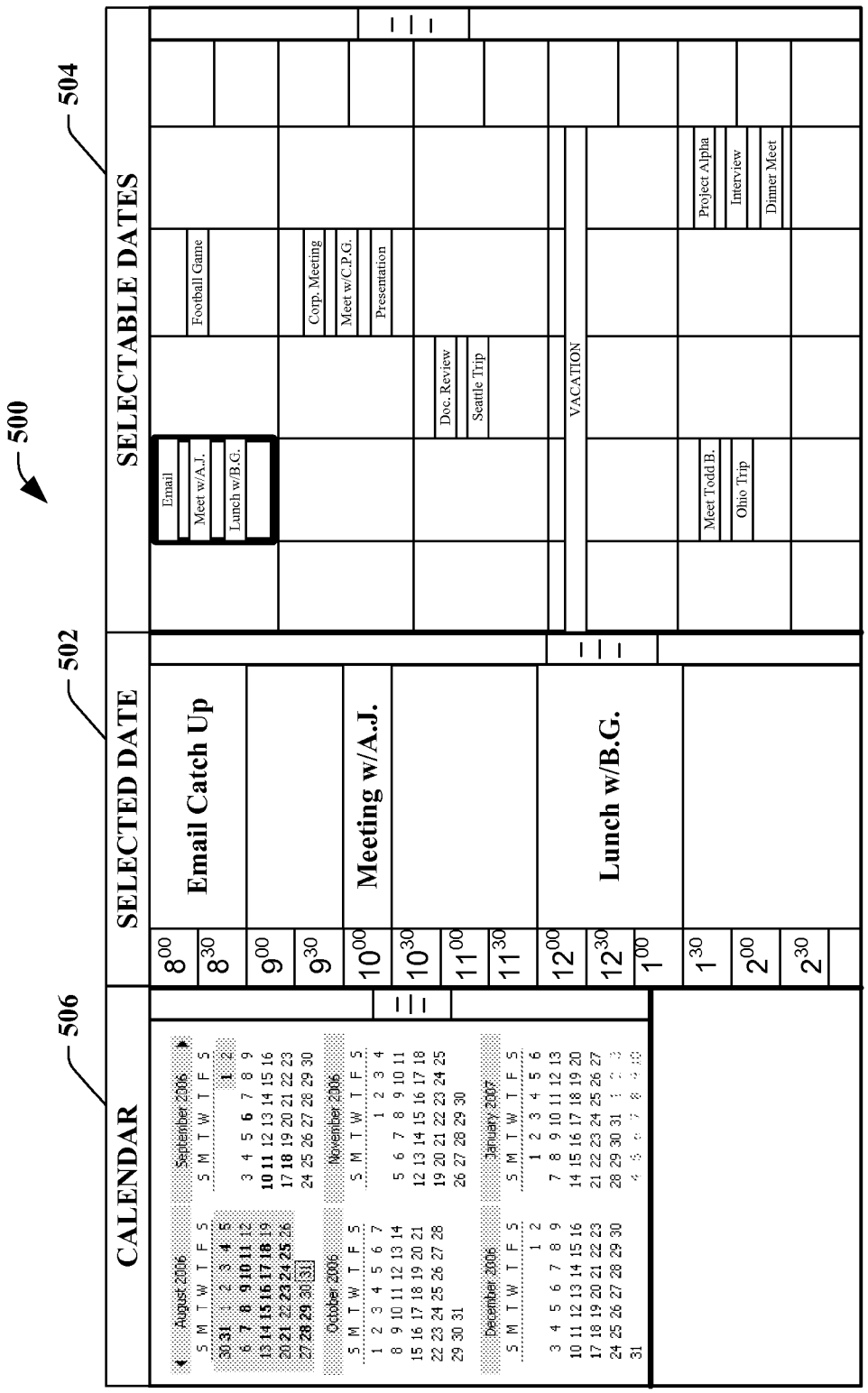
FIG. 5 illustrates a block diagram of an exemplary user interface that facilitates managing a plurality of events by allowing the display of a first selected date with correlating data and a second later date(s) with correlating data.

FIG. 5 illustrates a user interface 500 that facilitates managing a plurality of events by allowing the display of a first selected date with correlating data and a second later date(s) with correlating data. The user interface 500 can include a first field 502 that can display a detailed view of a selected date in a particular time-scale. In particular, the first field 502 can show the corresponding events for the particular date in half-hour increments. The user interface 500 further utilizes a second field 504 that includes selectable dates from which a user can select. For example, the second field 504 has a date bolded which identifies the selected date, and is further displayed in the first field 502. It is to be appreciated that any suitable technique and/or mechanism can be employed to select and/or show a particular date has been selected.

Moreover, it is to be appreciated and understood that the first field 502 displays event data in a first time-scale, while the second field displays event data in a disparate time-scale. Such simultaneous display allows a user to view events on a particular date while still having awareness of surrounding events. For example, upon a user verifying a lunch meeting with B. G. at 12:00 pm, the user can also see that two days later there is a football game on his or her calendar. Based on the amount of events associated with specific dates, the reference and/or titles for the events may not fit within the calendar, yet the event titles and/or references can be shortened to provide enough content to understand the event. For example, the selected date indicates email catch up at 8:00 am, yet on the second field, the event is titled "Email." It should be noted that providing shortened and/or short-hand titles allows the user enough context to understand the event and/or purpose of such event but does not clutter the calendar and optimizes readability without compromising functionality.

Moreover, the user interface 500 can include a third field 506 that can display a monthly calendar in order to allow a user to understand location within the calendar in reference to the year. The third field 506 can display a yearly calendar having just dates without event data details. For instance, the third field 506 can provide a larger scale view of where on the calendar a selected date is and/or surrounding dates are. In addition, the third field 506 can allow a user to easily change and/or view different years associated with the calendar (e.g. 2005, 1999, 2010, etc.).

Figure 6:
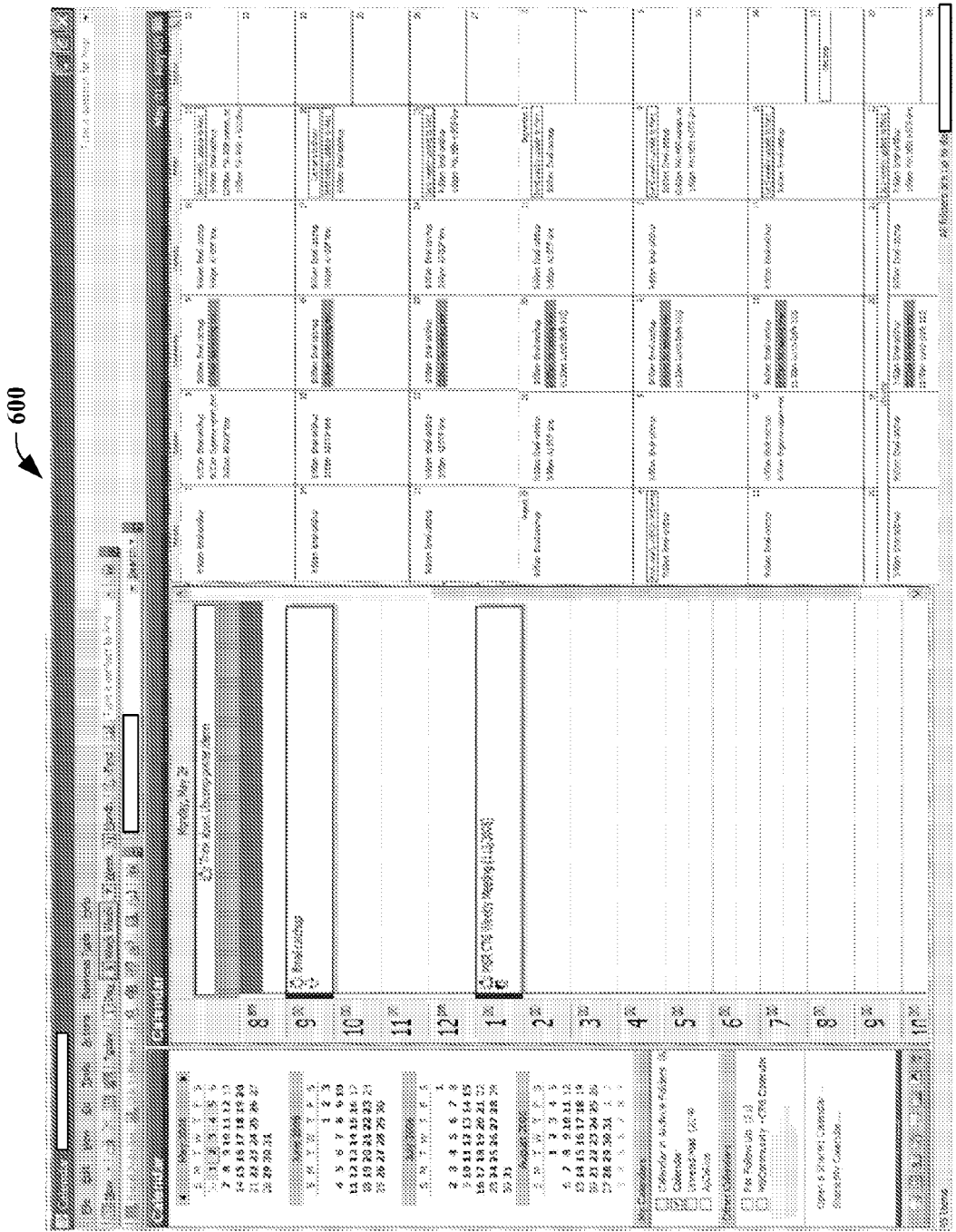
FIG. 6 illustrates a screen shot of an exemplary user interface that facilitates displaying calendar data for a selected date and a later date simultaneously.

FIG. 6 illustrates a screen shot 600 that facilitates displaying calendar data for a selected date and a later date simultaneously. The screen shot 600 illustrates a first field including a selected date, a second field having a portion of selectable dates, and a third field having a monthly calendar. The first field can display event data utilizing a first time-scale while the second field can display event data in a second time-scale simultaneously. In this particular example, the screen shot 600 illustrates the first field in half-hour increments with a second field in weekly increments.

Figure 7:
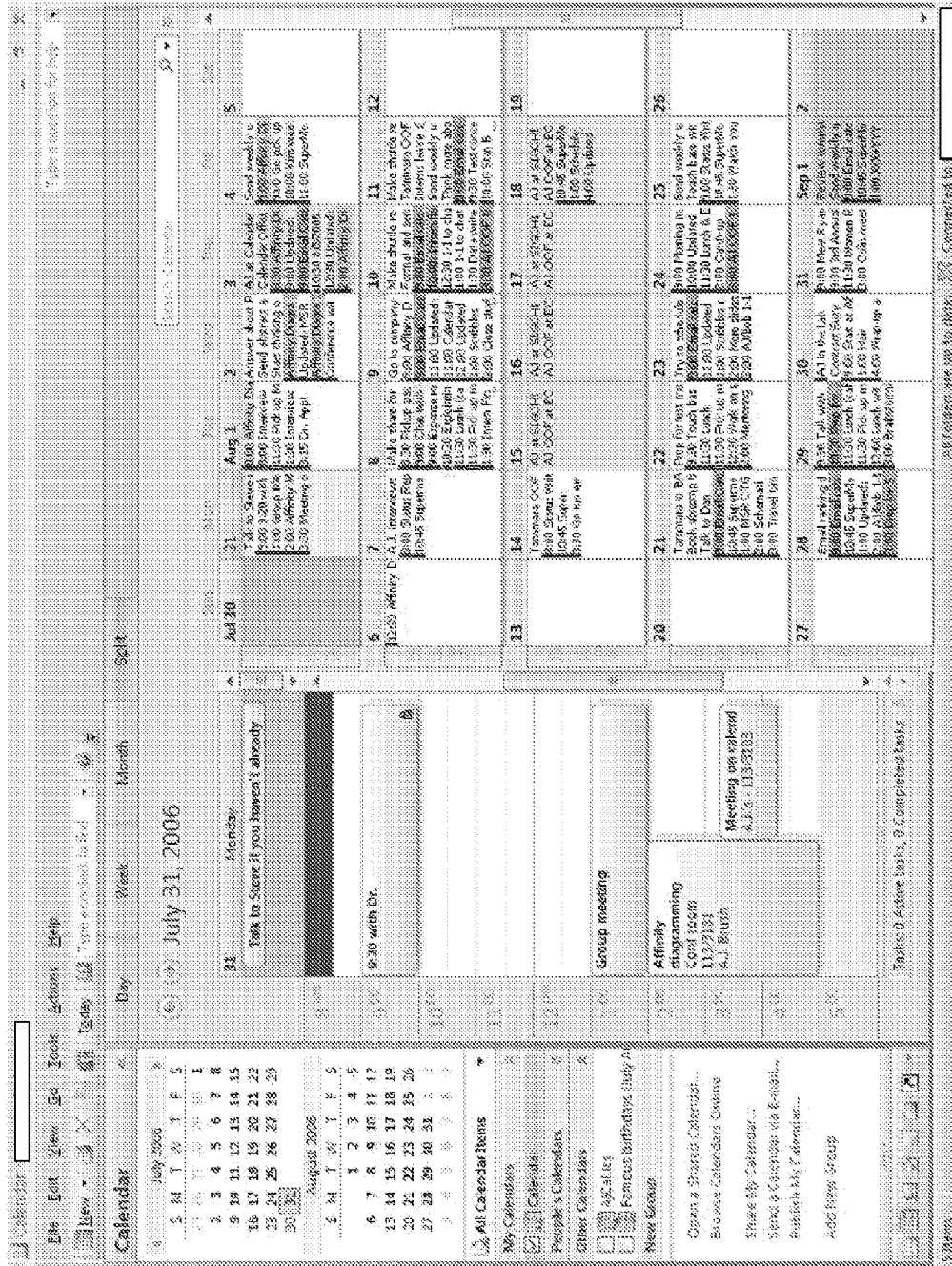
FIG. 7 illustrates a screen shot of an exemplary user interface that facilitates providing a user with calendar dates, events, and data to a user.
Figure 8:
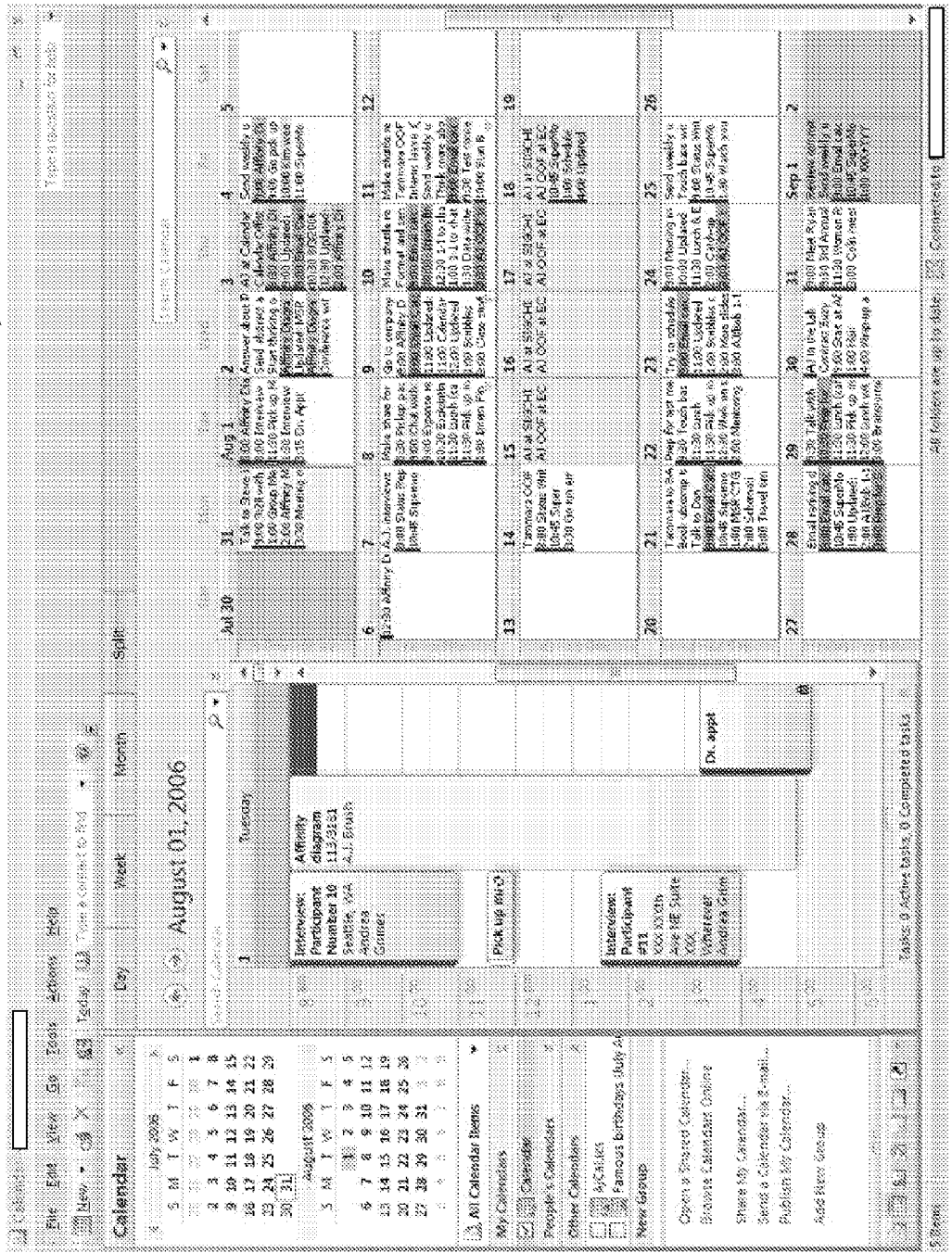
FIG. 8 illustrates a screen shot of an exemplary user interface that facilitates simultaneously providing data related to a first date and data related to a second date.

Referring quickly to FIG. 7 and FIG. 8, sequences of selection within a screen shot 700 and a screen shot 800 are illustrated that facilitate providing a user with calendar dates, events, and data to a user. Turning first to FIG. 7, the screen shot 700 illustrates a first date selected in a second field including a plurality of selectable dates. Based on the selection of Jul. 31, 2006, such date and event data can be displayed in the first field. Yet, it is to be understood that the second field simultaneously displays event data corresponding to surrounding dates in reference to Jul. 31, 2006. Yet, upon the selection of a disparate date, the first field can display event data corresponding to such selected date. Thus, turning to FIG. 8, the date of Aug. 1, 2006 can be selected, which initiates the display of event data correlating to such date to be displayed.

Figure 9:
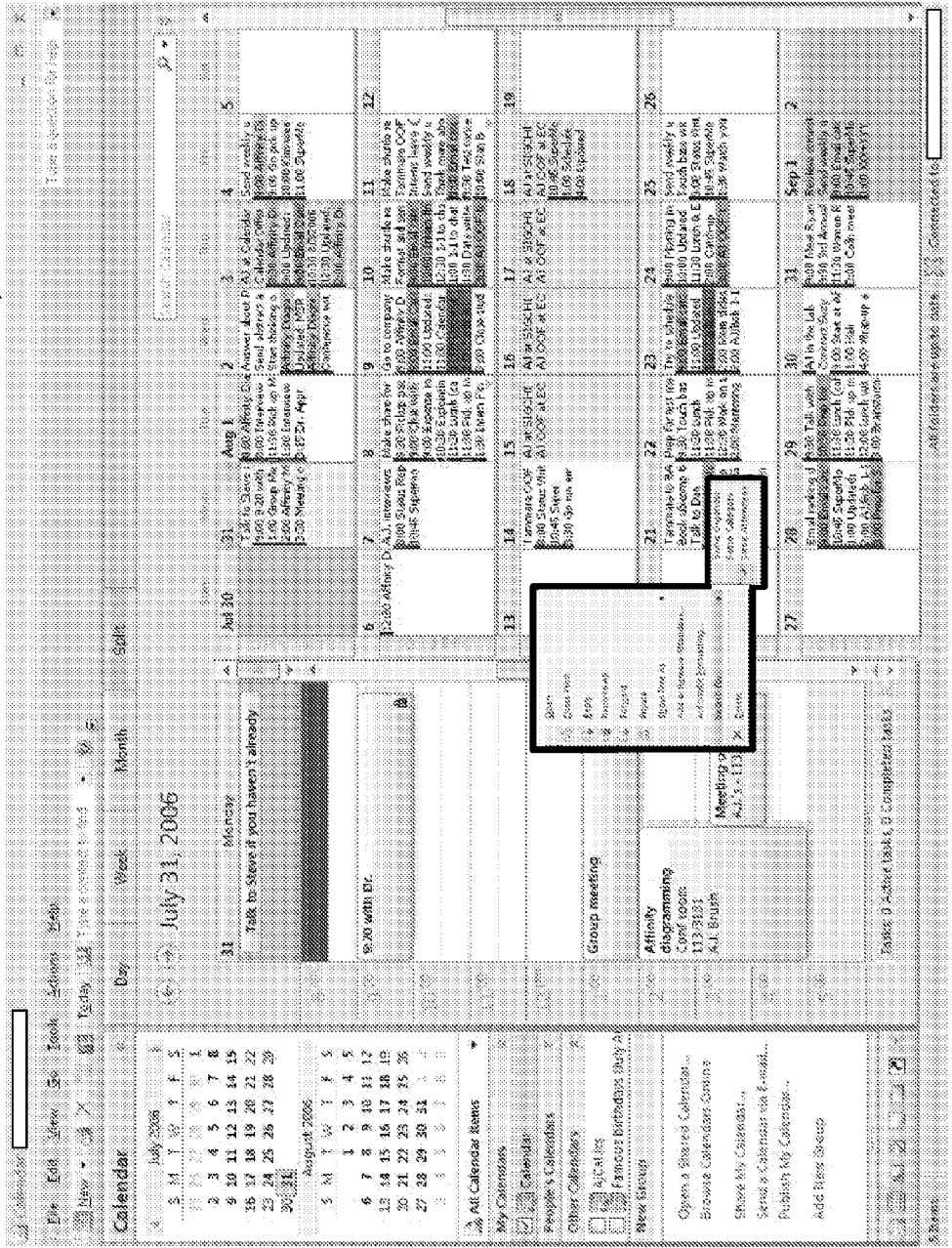
FIG. 9 illustrates a screen shot of an exemplary user interface that facilitates querying data associated with a calendar utilizing a bifocal view.

FIG. 9 illustrates a screen shot 900 that facilitates querying data associated with a calendar utilizing a bifocal view. The screen shot 900 illustrates an option for a search to identify and/or locate particular data based on a user input and/or search criteria. For example, an event associated with a particular date can be selected, wherein a search can be performed based on search criteria. For example, disparate events can be found that are related to the selected event, an event with a same event member can be identified, an event at the same location can be found, etc. In general, any suitable search criteria can be implemented to locate a corresponding event. It is to be appreciated that the results can be presented in any suitable manner to the user and such highlighted technique is not to be limiting on the claimed subject matter. In other words, the claimed subject matter can employ most any techniques to identify an event and/or item that satisfy particular search criteria.

Figure 10:
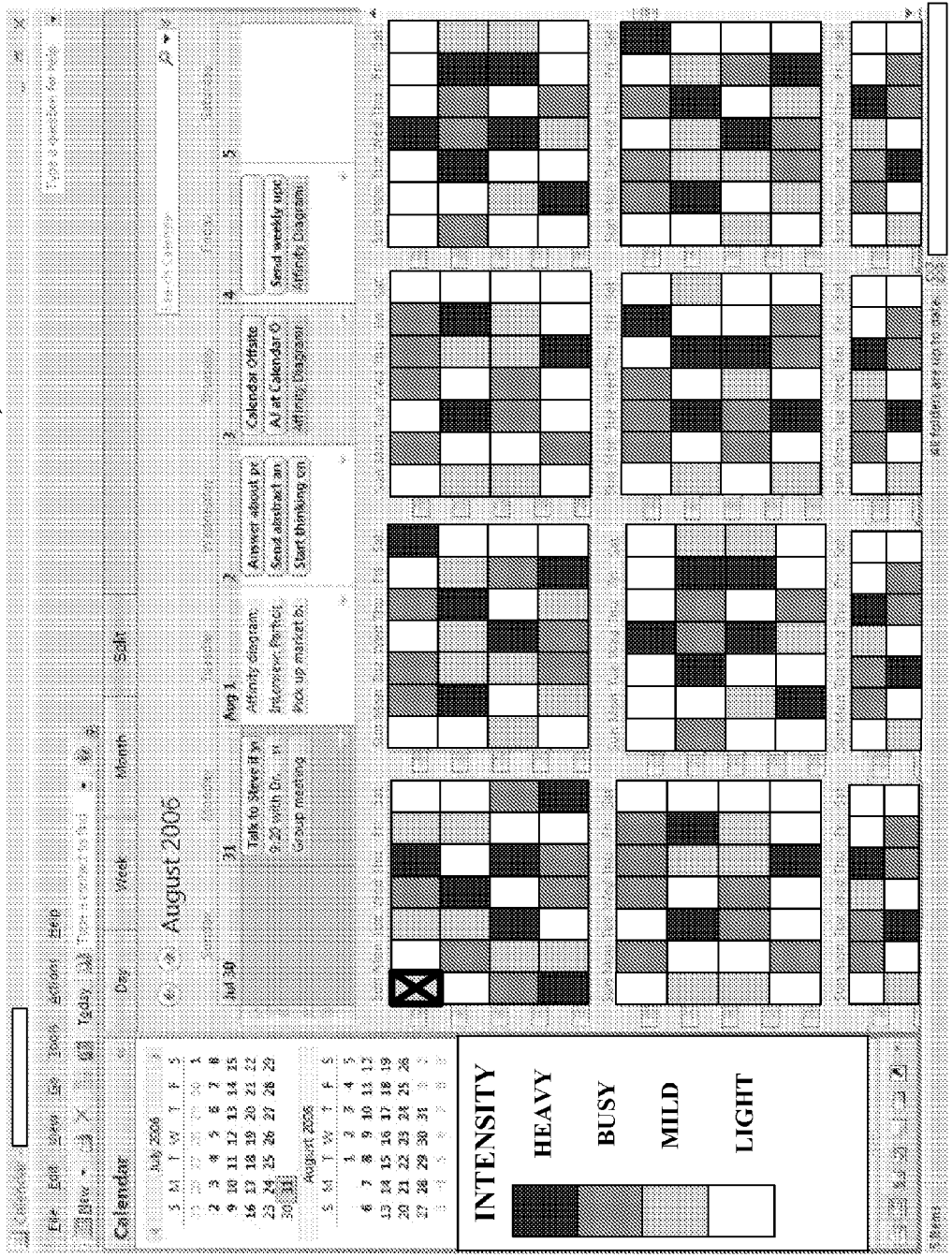
FIG. 10 illustrates a screen shot of an exemplary user interface that facilitates simultaneously displaying a selected date with an event and a disparate date with an event.

FIG. 10 illustrates a screen shot 1000 that facilitates simultaneously displaying a selected date with an event and a disparate date with an event. In particular, the screen shot 1000 illustrates the display of a first field, a second field and a third field. The screen shot 1000 provides a bifocal calendar view utilizing a first field with a weekly incremented view and respective event data and a second field with a monthly incremented view with respective event data. It is to be noted that the "X" can denote the selected date that is displayed in the first field. Moreover, the screen shot 1000 includes a third field that displays a monthly calendar in order to provide prospective to the user and/or entity utilizing such bifocal calendar view. In particular, the screen shot 1000 provides a unique outlook for events utilizing a color variance that correlates to intensity and/or how many events are associated to a particular date. Thus, a user and/or entity can view the first field and comprehend their schedule for the week but also get an understanding of how busy and/or how many events surround that selected week based on the color variance illustrated. Thus, a black day would be a heavy event-filed day, while a white day would be a light event-filed day. By providing event data associated with a particular date and surrounding dates, utilizing the calendar is greatly improved in relation to planning, scheduling, re-scheduling, meetings, conflict checks, and the like. Furthermore, it is to be appreciated that the second field can be zoomed in and/or selected to get a more magnified view of dates and/or event data. For instance, a user can select a disparate time-scale and/or select a portion of the second field to magnify.

Figure 11:
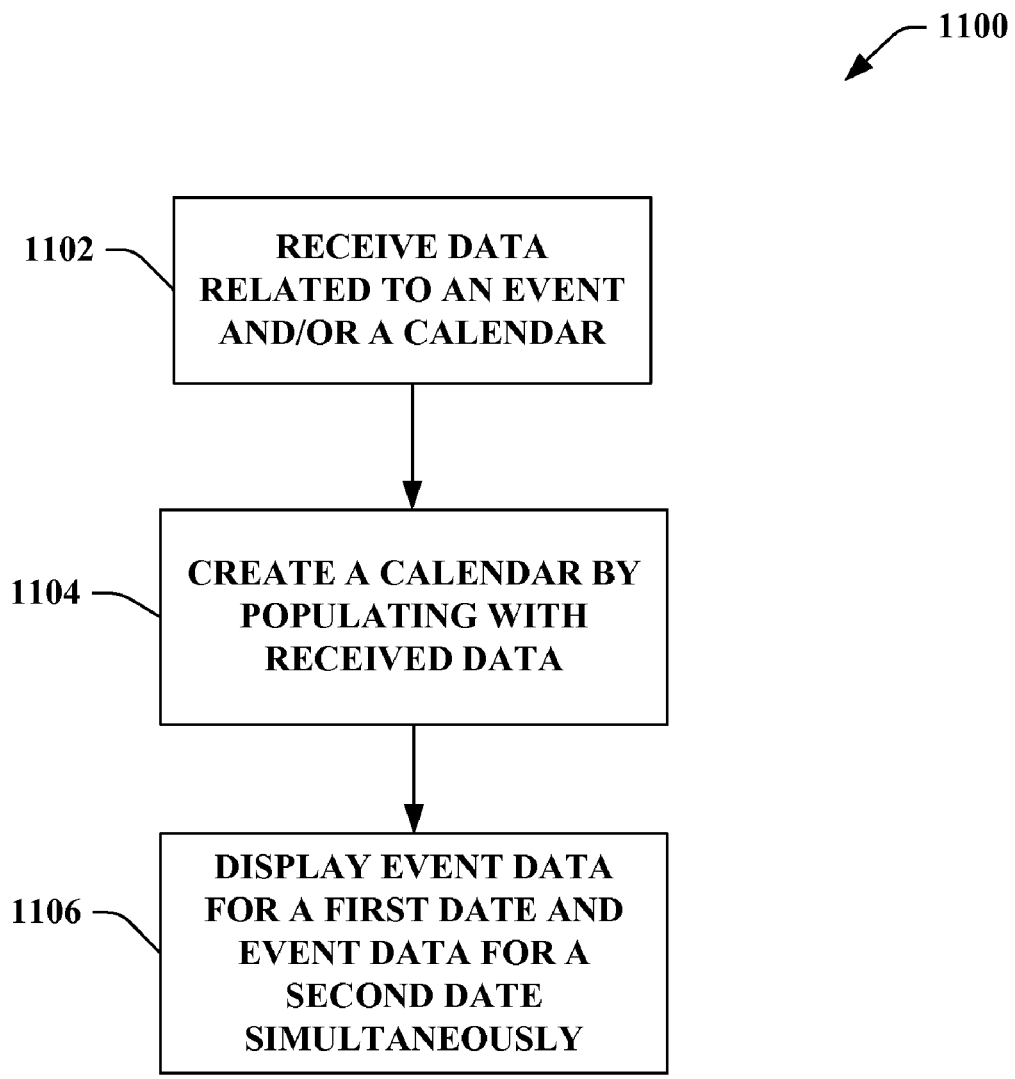
FIG. 11 illustrates an exemplary methodology that facilitates creating a calendar that implements a bifocal view to enable optimized awareness of events.
Figure 12:
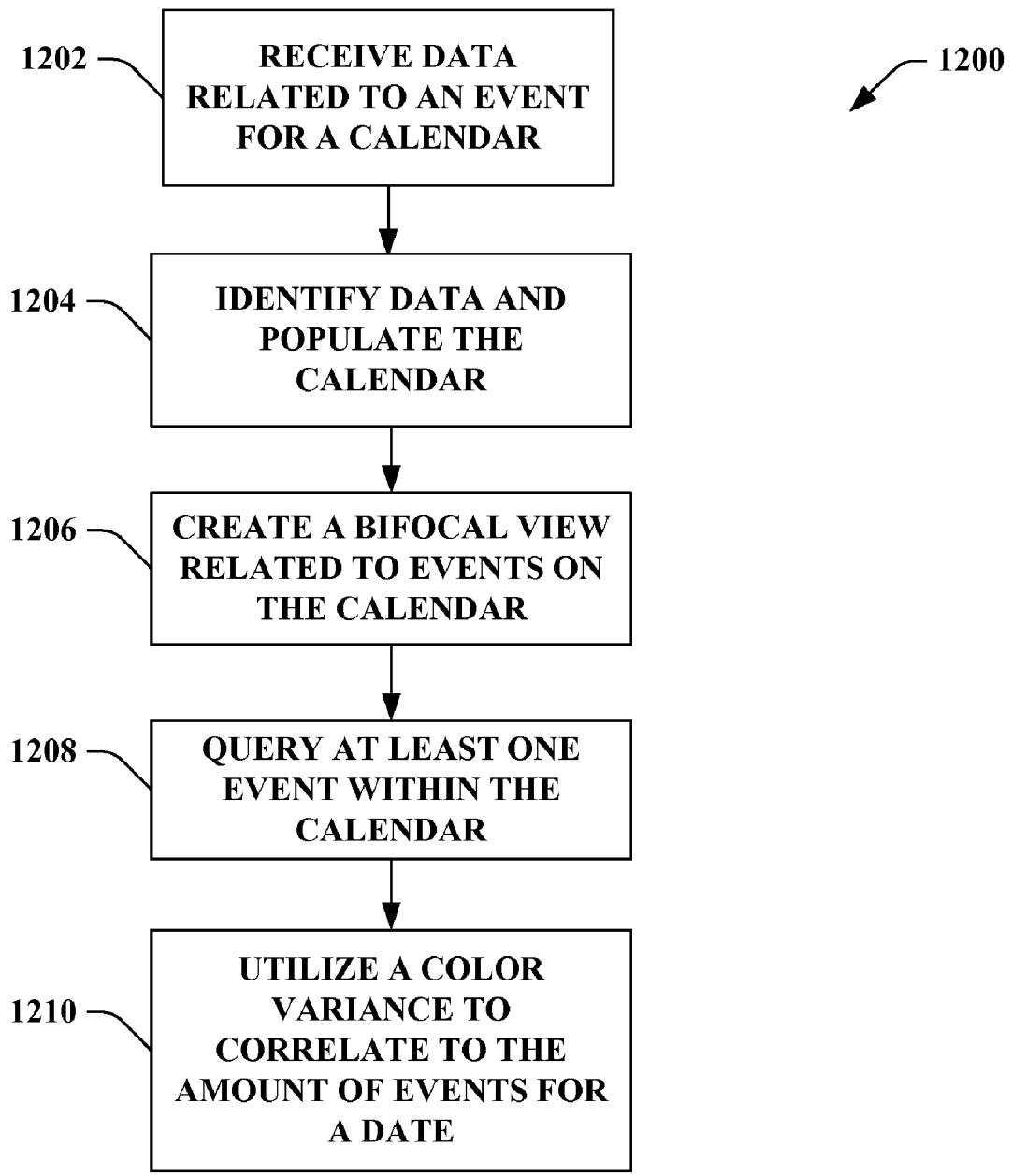
FIG. 12 illustrates an exemplary methodology for utilizing a bifocal view that displays a selected portion of data related to a first date and a portion of data related to a second later date.

FIGS. 11-12 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 11 illustrates a methodology 1100 for creating a calendar that implements a bifocal view to enable optimized awareness of events. At reference numeral 1102, data can be received, wherein the data can relate to at least one of a calendar and an event. For instance, the data can be, but is not limited to, events (e.g., any suitable thing that happens and/or occurs, an occasion and/or activity), a date, an appointment, a schedule, a meeting, a time, a setting, a preference, a configuration, a meeting date correlating to a time and/or date, event data (e.g., who, what, where, why, how, etc.), calendar date, etc.

At reference numeral 1104, a calendar can be created that employs a bifocal calendar view. The bifocal calendar view can allow a user and/or any suitable entity (e.g., machine, computer, user, network, etc.) to view events on a particular date(s) while still having awareness and a view associated with upcoming and/or past events. At reference numeral 1106, event data associated with a first date and event data associated with a second date can be displayed simultaneously with the bifocal calendar view. In other words, the bifocal calendar view allows event data corresponding to a selected date on the calendar to be displayed while also displaying event data corresponding to a portion of disparate dates on the calendar.

For instance, a user can select Sep. 21, 2006 as a date to view all related events that day (e.g., a meeting at 1:00 pm, a scrimmage at 4:00 pm, etc.), yet the calendar can simultaneously display other dates and/or events. Thus, while displaying Sep. 21, 2006 and related events, the bifocal calendar view can further display disparate dates and events to the user. Therefore, while a user is viewing the current selected date (e.g., in this example, Sep. 21, 2006), he and/or she is aware of upcoming and/or surrounding events scheduled for disparate dates (e.g., vacation on September 24 through September 26, etc.).

FIG. 12 illustrates a methodology 1200 that facilitates utilizing a bifocal view that displays a selected portion of data related to a first date and a portion of data related to a second later date. At reference numeral 1202, data related to an event for a calendar can be received. At reference numeral 1204, data can be identified and populated into the calendar. For example, data can be evaluated and populated and/or sorted into dates associated therewith. Thus, if an event is a lunch on Oct. 27, 2006, the event data can be populated into the calendar accordingly.

At reference numeral 1206, a bifocal view related to events on the calendar can be created. The bifocal view allows the display of event data corresponding to a selected date on the calendar while also displaying event data corresponding to a portion of disparate dates on the calendar utilizing at least one time increment and/or scale. At reference numeral 1208, at least one event within the calendar can be queried. The bifocal view can implement searching and/or data querying based on search criteria provided by, for instance, a user. Thus, if a user wanted to search the calendar for all events with the word "Tom Jones," such events can be identified on the bifocal view for the calendar.

At reference numeral 1210, a color variance can be utilized to correlate to the amount of events on a particular date. For instance, a user and/or entity can view bifocal view and comprehend their schedule for the selected date but also get an understanding of how busy and/or how many events surround that selected date based on the color variance illustrated. For instance, a heavy and/or event-filled day can be depicted with a dark color, while a light and/or empty event day can be depicted with a light color. It is to be appreciated that the event data for a selected date and the event data for a portion of selectable dates can be displayed simultaneously while also depicting the amount of events for each date respectively.

Figure 13:
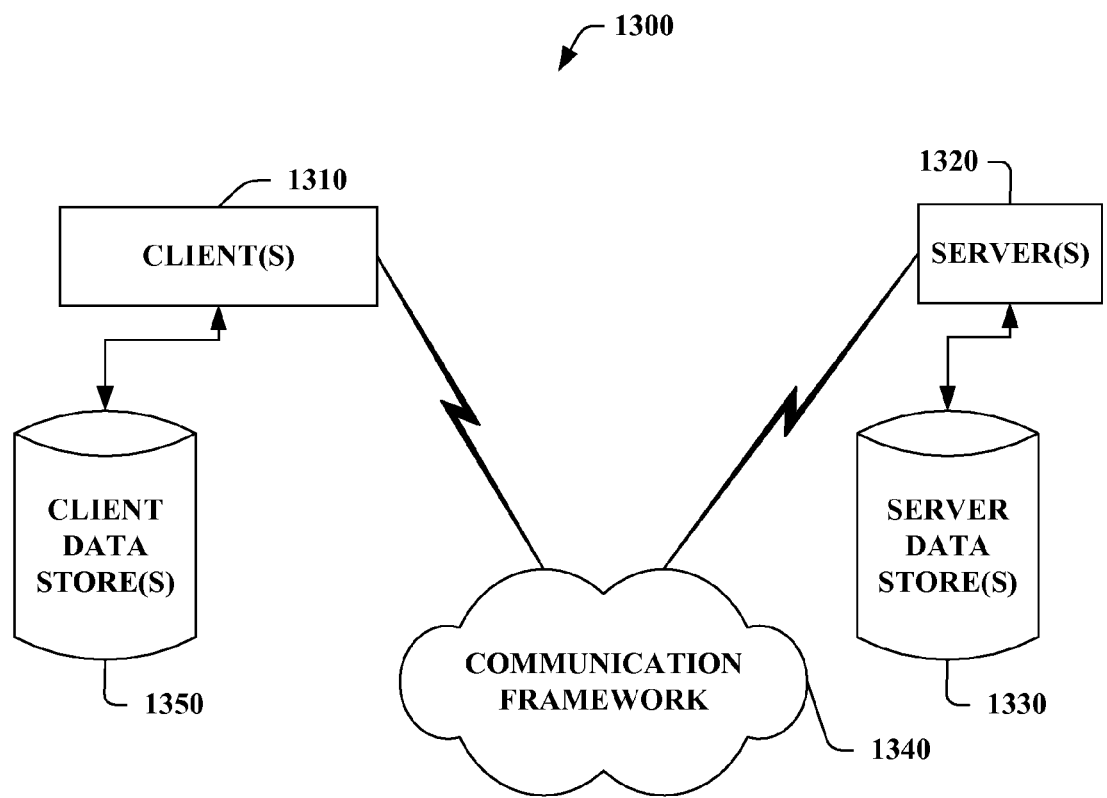
FIG. 13 illustrates an exemplary networking environment, wherein the novel aspects of the claimed subject matter can be employed.
Figure 14:
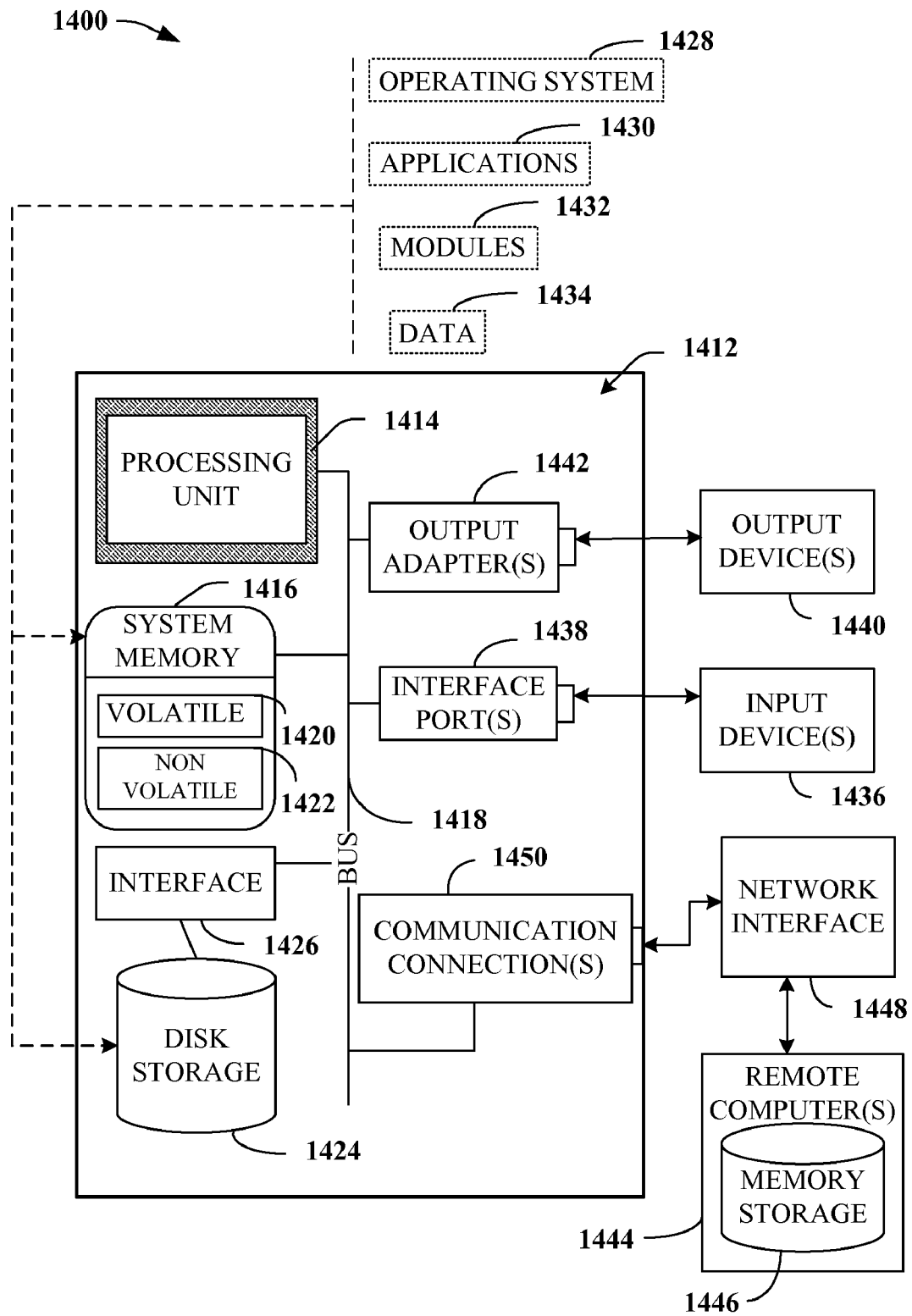
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For example, an enhanced scheduler component that employs a bifocal view that displays a selected portion of data related to a first date and a portion of data related to a second date, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s)

1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates creating a calendar that enables optimized awareness of at least one event, comprising:
   one or more processors;
   an interface component that receives data related to at least one event;
   an enhanced scheduler component that creates a calendar that discloses at least two views concurrently, a first event data portion correlates to a date with a first time-scale used by a first concurrent view and a supplemental event data portion correlates to a date with a supplemental time-scale used by a supplemental concurrent view, the enhanced scheduler component displays the event data portions of both the first view and supplemental view upon disclosure of the calendar;
   a settings component that implements settings or configurations corresponding to a plurality of user profiles with each user profile relating to a user, the settings component allowing a first user to change how the data of the at least one event relating to the first user is displayed on the calendar such that the data of the at least one event relating to the first user is displayed differently from that of a second user;
   a search component that identifies and locates particular data associated with a first event based on search criteria and provides event linkage between the first event and one or more other events by identifying relationships between the first event and the one or more other events; and
   an intelligence component that infers states of the system and each user of the calendar to facilitate updating of the calendar, the intelligence component further being configured to generate a probability distribution over the states of the system and each user of the calendar based at least in part on a consideration of data and events associated with the calendar, the inferring states of the system including inferring time-scales, views, event data, display settings, user configurations, visual layout, user settings, the plurality of user profiles, event linkages, scheduling conflicts, clutter reduction, meeting data, and query data associated with the calendar.

2. The system of claim 1, wherein the enhanced scheduler component automatically edits at least a portion of an event's information to ensure the event information is sized-to-fit within a display space on the calendar.

3. The system of claim 1, further comprising a data manager component that evaluates data related to the at least one event to utilize the calendar.

4. The system of claim 3, wherein the data manager component provides at least one of the following:
   placing an event with a corresponding date within the calendar; providing event linkage that identifies a relationship between one or more events; identifying a conflict associated with one or more events; planning; scheduling; searching for an event; presenting information to the user; and identifying user-defined event data to display on the calendar that includes at least one of a meeting location, an appointment member, a time of event, and a meeting response.

5. The system of claim 1, wherein the settings component that implements at least one of a default user configuration, a user-defined setting, and a combination of a default user configuration and a user-defined setting.

6. The system of claim 1, wherein the search component enables a query to be implemented within the calendar, the search component further identifying at least one result associated with the query in the calendar utilizing at least one of a highlight, a bold, a color, a pointer, and a graphic.

7. The system of claim 1, wherein the calendar utilizes a color variance to illustrate an intensity that correlates to an amount of events associated with a date.

8. A user interface that facilitates displaying data associated with a calendar, comprising:
   a first field that displays a selected date from a date set with first event data of the selected date in a first time-scale;
   a second field that displays the date set with associated event data for at least one non-selected date of the date set in a second time-scale based upon a result of a query that is based upon at least one input parameter, the associated event data that meets at least one input parameter of a query is visually distinguished within the second field;
   a third field that displays the calendar that includes the selected date and the date set;
   the calendar including a settings component that implements settings or configurations corresponding to a plurality of user profiles with each user profile relating to a user, the settings component allowing a first user to change how data of at least one event relating to the first user is displayed on the user interface such that the data of the at least one event relating to the first user is displayed differently from that of a second user, the settings component utilizing an intelligence component that infers states of the calendar and each user of the calendar to update the first field, the second field, and the third field and generates a probability distribution over the states of the calendar and each user of the calendar, the inferring states of the calendar including inferring time-scales, views, event data, display settings, user configurations, visual layout, user settings, the plurality of user profiles, event linkages, scheduling conflicts, clutter reduction, meeting data, and query data associated with each calendar;

the calendar including a search component that identifies and locates particular data associated with a first event based on search criteria and provides event linkage between the first event and one or more other events by identifying relationships between the first event and the one or more other events; and a processor operatively coupled to memory executing an instruction in relation to the user interface.

9. The user interface of claim 8, wherein the first field illustrates event data in a more granular manner in comparison to the second field.

10. The user interface of claim 8, wherein the first field and the second field constitute the calendar that enables a user to view event data related to the selected date and event data related to surrounding dates in reference to the selected date.

11. The user interface of claim 10, wherein the calendar utilizes a color variance to illustrate an intensity that correlates to an amount of events associated with a date.

12. The user interface of claim 8, wherein the user interface automatically edits at least a portion of an event's information to ensure the event information is sized-to-fit within the display space on the calendar.

13. The user interface of claim 8, wherein at least one of the first field and the second field display event data that includes an event time, an event member, an event member response, an event location, a type of event, an attendance of an event, a priority of an event, a date of an event, and an alert associated with an event.

14. The system of claim 1, wherein the date of the first event data portion and the date of the supplemental event data portion are a same date.

15. The system of claim 1, wherein the date of the first event data portion and the date of the supplemental event data portion are different dates.

16. The system of claim 1, wherein the event of the first event data portion and the event of the supplemental event data portion are a same event.

17. The system of claim 1, wherein the event of the first event data portion and the event of the supplemental event data portion are different events.

18. The system of claim 1, wherein the first event data portion and the supplemental event data portion are of a different detail level from one another.

19. The user interface of claim 8, wherein the second field displays the selected date integrated with the at least one non-selected date and the first event data that meets the at least one input parameter of the query is visually distinguished within the second field.

20. A system that facilitates creating a calendar that enables optimized awareness of at least one event, comprising:

one or more processors;

means for receiving data related to at least one event;

means for creating a calendar that discloses at least two views concurrently, a first event data portion correlates to a date with a first time-scale used by a first concurrent view and a supplemental event data portion correlates to a date with a supplemental time-scale used by a supplemental concurrent view, the first event data portion and the supplemental event data portion are of different detail level from one another, and displaying the event data portions of both the first view and supplemental view upon disclosure of the calendar while the event of the first event data portion and the event of the supplemental event data portion are a same event on a same date;

means for implementing settings or configurations corresponding to a plurality of user profiles with each user profile relating to a user, the means for implementing allowing a first user to change how the data related to the at least one event relating to the first user is displayed on the calendar such that the data related to the at least one event relating to the first user is displayed differently from that of a second user;

means for identifying and locating particular data associated with a first event based on search criteria and means for providing event linkage between the first event and one or more other events by identifying relationships between the first event and the one or more other events; and means for inferring states of the system and each user of the calendar to facilitate updating of the calendar, the means for inferring states of the system including means for inferring time-scales, views, event data, display settings, user configurations, visual layout, user settings, the plurality of user profiles, event linkages, scheduling conflicts, clutter reduction, meeting data, and query data associated with the calendar, and the means for inferring including means for generating a probability distribution over the states of the system and each user of the calendar.

* * * * *

UNITED STATES PATENT AND TRADEMARK OFFICE
CERTIFICATE OF CORRECTION

| | | |
|---|---|---|
| PATENT NO. | : 8,069,417 B2 | Page 1 of 1 |
| APPLICATION NO. | : 11/537523 | |
| DATED | : November 29, 2011 | |
| INVENTOR(S) | : Alice Jane Brush et al. | |

It is certified that error appears in the above-identified patent and that said Letters Patent is hereby corrected as shown below:

In column 16, line 35, in Claim 5, before "implements" delete "that".

Signed and Sealed this

Thirty-first Day of January, 2012

David J. Kappos
*Director of the United States Patent and Trademark Office*